(12) United States Patent
Chen et al.

(10) Patent No.: US 10,388,464 B2
(45) Date of Patent: Aug. 20, 2019

(54) METHOD FOR MANUFACTURING A LEADLESS SOLID ELECTROLYTE CAPACITOR AND CORRESPONDING CAPACITOR

(71) Applicant: BIOTRONIK SE & Co. KG, Berlin (DE)

(72) Inventors: Singjang Chen, Beaverton, OR (US); Larry Karnosh, Tualatin, OR (US)

(73) Assignee: BIOTRONIK SE & Co. KG, Berlin (DE)

( * ) Notice: Subject to any disclaimer, the term of this patent is extended or adjusted under 35 U.S.C. 154(b) by 107 days.

(21) Appl. No.: 15/678,429

(22) Filed: Aug. 16, 2017

(65) Prior Publication Data

US 2018/0082795 A1    Mar. 22, 2018

Related U.S. Application Data

(60) Provisional application No. 62/396,246, filed on Sep. 19, 2016.

(51) Int. Cl.
*H01G 2/06* (2006.01)
*H01G 9/00* (2006.01)
(Continued)

(52) U.S. Cl.
CPC ......... *H01G 9/0525* (2013.01); *H01G 9/0029* (2013.01); *H01G 9/012* (2013.01); *H01G 9/052* (2013.01); *H01G 9/10* (2013.01); *H01G 9/15* (2013.01); *H01G 2/06* (2013.01); *H01G 9/042* (2013.01)

(58) Field of Classification Search
CPC ........ H01G 9/0525; H01G 9/10; H01G 9/052; H01G 9/012; H01G 9/0029; H01G 9/15; H01G 2/06
See application file for complete search history.

(56) References Cited

U.S. PATENT DOCUMENTS 3,588,626 A    6/1971 Cooper
3,588,627 A *  6/1971 Markarian ............. H01G 9/012
                                                                29/25.03
(Continued)

OTHER PUBLICATIONS

US 5,849,292 A1, 02/2005, Huntington (withdrawn)

*Primary Examiner* — Nathan Milakovich
(74) *Attorney, Agent, or Firm* — Buchanan Ingersoll & Rooney PC

(57) ABSTRACT

A method for manufacturing an electrolyte capacitor including at least the following steps: placing a valve-metal anode slug with its lower side on a substrate with a non-conductive epoxy target area without solder mask, curing the non-conductive epoxy, depositing a first conductive layer on the first end-face of the valve-metal anode slug and curing the first conductive layer, forming a dielectric on the valve-metal material of the valve-metal anode slug by anodization, depositing and curing a first non-conductive layer to cover an exposed surface of the first conductive layer, depositing a MnO₂ layer and an electrically conductive coating, depositing a second conductive layer on the second end-face of the valve-metal anode slug and curing the second conductive layer, overmolding, and singulating of each single capacitor and the assembled substrate.

13 Claims, 8 Drawing Sheets

(51) Int. Cl.
  *H01G 9/012* (2006.01)
  *H01G 9/042* (2006.01)
  *H01G 9/052* (2006.01)
  *H01G 9/10* (2006.01)
  *H01G 9/15* (2006.01)

(56) References Cited

U.S. PATENT DOCUMENTS

| | | | | |
|---|---|---|---|---|
| 3,986,869 A | * | 10/1976 | Oishi | B22F 5/003 |
| | | | | 428/553 |
| 4,349,860 A | * | 9/1982 | Ohsawa | H01G 9/012 |
| | | | | 361/306.1 |
| 4,599,788 A | | 7/1986 | Love et al. | |
| 6,144,558 A | * | 11/2000 | Shiota | H05K 3/305 |
| | | | | 174/254 |
| 6,512,183 B2 | * | 1/2003 | Mitani | H05K 3/321 |
| | | | | 174/257 |
| 7,349,197 B2 | * | 3/2008 | Ando | H01G 2/065 |
| | | | | 29/25.01 |
| 8,039,760 B2 | * | 10/2011 | Sagawa | H05K 3/247 |
| | | | | 174/260 |
| 8,199,461 B2 | * | 6/2012 | Zednicek | H01G 9/012 |
| | | | | 361/528 |
| 8,213,160 B2 | * | 7/2012 | Saito | H01G 9/012 |
| | | | | 361/523 |
| 2014/0067303 A1 | * | 3/2014 | Millman | G01R 31/016 |
| | | | | 702/84 |
| 2016/0055978 A1 | * | 2/2016 | Ning | H01G 4/228 |
| | | | | 361/306.1 |

* cited by examiner

METHOD FOR MANUFACTURING A LEADLESS SOLID ELECTROLYTE CAPACITOR AND CORRESPONDING CAPACITOR

CROSS-REFERENCE TO RELATED APPLICATIONS

This patent application claims the benefit of co-pending U.S. Provisional Patent Application No. 62/396,246, filed on Sep. 19, 2016, which is hereby incorporated by reference in its entirety.

TECHNICAL FIELD

The present invention refers to a method for manufacturing a leadless solid electrolyte capacitor and a respective leadless solid electrolyte capacitor.

BACKGROUND

Leadless solid electrolyte capacitors comprising pressed and sintered powdered valve-metal material achieve high capacitance per volume and are characterized by low weight. In particular, tantalum capacitors are attractive for flat or small products such as, for example, mobile telephones or digital cameras.

In a conventional method for manufacturing a tantalum capacitor with a lead frame, in a first step, a pellet of tantalum powder is pressed and sintered and afterwards singulated forming a tantalum anode slug. Then, the tantalum anode slug is welded to a processing bar. Afterwards, together with the processing bar, the tantalum anode slug is immersed in an anode dielectric formation bath for oxidation by an electrochemical process. Then, several cathode layers containing $MnO_2$ are deposited, before a silver coating is provided over the $MnO_2$ layers. The tantalum slugs are removed from the processing bar and placed on a lead frame, to which anode and cathode are then attached with silver-filled epoxy. After transfer molding during the next step, anode and cathode are electrically plated and the tantalum capacitor is placed into a fixture for voltage conditioning (burn-in).

The above described conventional method partially produces capacitors with poor yields and poor long-term reliability because there is a high likelihood to damage the anodized tantalum anode slug during cathode deposition, lead attachment and transfer molding process steps during which high mechanical stress is applied to the slug. Additionally, the above described process is cost-intensive due to case size-specific overmold tooling and burn-in fixtures, as well as individual part process steps (such as tantalum anode bar welding process, and singulation of the tantalum slug after anodization and cathode deposition process). Such capacitors also have a poor volumetric efficiency because the leaded design itself is volume inefficient (active anode volume/tantalum capacitor volume) due to the lead itself. Such tantalum capacitors further have limited potential for miniaturization as individual part process steps, such as tantalum anode bar welding process and singulation tantalum anode slug after anodization and cathode deposition process, make the miniaturization impractical for capacitors of case size 0603 or smaller.

U.S. Pat. No. 4,599,788 discloses a manufacturing process for a solid electrolyte capacitor by screen printing an array of pads of a tantalum ink composition onto a tantalum substrate, placing a tantalum pellet on one end of said pads, sintering together the assembly of said substrate, pads and pellets, the array is then anodized forming an oxide layer over all the surfaces. Then, a thermally stable polymer is applied in a grid pattern in the spaces along rows and columns, separating the pellet-pad-structures from each other. After that, the cathode is formed by deposition of solid manganese oxide electrolyte and of a conductive layer. A similar process is also described by U.S. Pat. No. 6,849,292. As such known process uses form and size adapted hard tooling to press individual tantalum anode slugs onto a tantalum substrate prior sintering, it is impractical and cost prohibitive to make a tantalum capacitor smaller than 0603 case size with this approach. Additionally, this process requires individual voltage conditioning (burn-in) of each capacitor at the end of the process, which is expensive and provides mechanical stress to each capacitor.

U.S. Pat. No. 3,588,626 refers to a leadless solid electrolyte tantalum capacitor which comprises an anode consisting of a porous tantalum section and a non-porous tantalum section integrally connected with each other, forming a unitary anode. Anodizing the unitary anode provides a singular dielectric layer formed over the surface of the composite anode. Further, a Teflon coating is painted over portions of the dielectric layer formed on the porous tantalum section. Due to the Teflon coating, only the surface of the non-porous tantalum section is covered by a cathode forming a $MnO_2$ layer and an additional conductive layer. Upon removal of the Teflon coating, the surface of the porous section can be used as an anode termination by any desired means. This document describes a method in which the conventional lead (or bar) is replaced with a tantalum pad with same welding process or pressed and sintering process. Therefore, it has the same short coming as the conventional leaded process described above. Additionally, this process requires individual voltage conditioning (burn-in) of each capacitor at the end of the process, which is expensive and provides mechanical stress to each capacitor.

The present invention is directed toward overcoming one or more of the above-mentioned problems.

SUMMARY

Considering the above, a goal of the present invention is to provide a simple and cost-effective method for manufacturing a leadless valve-metal capacitor with low damage potential and minimizing the handling of individual capacitors during manufacturing. Accordingly, a goal consists in forming a capacitor with good volume efficiency, leading to a higher capacitance value or voltage rating in the same or lower case size than the conventional design. Additionally, yield and long-term reliability need to be enhanced.

At least the above problem(s) is solved by a method for manufacturing a leadless solid electrolyte capacitor comprising the steps mentioned in claim 1.

In particular, the inventive method comprises at least the following steps:

placing a valve-metal anode slug with its lower side on a substrate with a first conductive pad, a second conductive pad, and a, preferably screen printed, non-conductive epoxy target area free of solder-mask materials, wherein the non-conductive epoxy target area free of solder-mask is accommodated in between and electrically isolating the first conductive pad and the second conductive pad, curing the non-conductive epoxy, depositing a first conductive layer on the first end-face of the valve-metal anode slug and curing the first conductive layer, thereby electrically connecting the valve-metal anode slug with the first conductive pad, forming a dielectric on the valve-metal material of the valve-metal anode slug by anodization (electrochemical process), depositing and curing a first non-conductive layer to cover an exposed surface of the first conductive layer, depositing a $MnO_2$ layer, preferably several times, and an electrically conductive coating, preferably Ag or graphite, on the exposed surfaces of the oxidized valve-metal anode slug, depositing a second conductive layer on the second end-face of the valve-metal anode slug and curing the second conductive layer, thereby forming a cathode connected with the second conductive pad, overmolding, and singulating of each single capacitor and the assembled substrate, in case the above procedure was accomplished for a plurality of valve-metal anode slugs on a single substrate, preferably using standard sawing or laser cutting equipment.

The valve-metal anode slug may be produced by pressing and sintering of a pellet of a powder valve-metal material, preferably tantalum, followed by singulating a plurality of valve-metal anode slugs from the sintered pellet, and placing them into tape and reel pockets. One resulting valve-metal anode slug may be box-shaped.

In another embodiment of the inventive method, between the overmolding and the singulating steps, voltage conditioning is conducted which adds great benefit to the resulting leadless solid electrolyte capacitor.

The above method has the advantage that the valve-metal anode slug, preferably made of tantalum, can be placed on a substrate and secured with the non-conductive epoxy so that mechanical handling damage to the fragile anode slug is avoided during anodizing, cathode deposition, lead attachment, and transfer molding process steps. Also, the usage of a substrate panel as a fixture allows downscaling of the case size of the valve-metal electrolyte capacitor toward 0201 or 01005 case sizes for tantalum, as compared to the smallest size (0603 case size) that traditional leaded tantalum capacitor manufacturing processes can produce.

The inventive method uses the substrate (substrate panel) itself as a fixture for a plurality of valve-metal anode slugs throughout the manufacturing process, even during voltage conditioning. This saves the cost for valve-metal electrolyte capacitor case sizes-specific overmold tooling and burn-in fixtures. Also, this invention uses the substrate as a fixture that enables batch manufacturing processes with substantially lower costs as compared to traditional tantalum capacitor individual part process steps (such as tantalum anode bar welding process and singulation tantalum slugs after anodization and cathode deposition process). For example, according to a preferred embodiment of the present invention, a SMT (Surface Mount Technology) pick and place machine can be used in order to place the valve-metal anode slug on the substrate.

In an embodiment, a grid of first connectors is provided on the lower side of the substrate electrically connecting all first conductive pads of the upper side of the substrate with one anode terminal, preferably accommodated on the lower side of the substrate, wherein the dielectric formation is accomplished by connecting the positive side of the power supply with the anode terminal and placing the substrate into an anodize solution tank. After immersion in the anodizing solution, the capacitor assembly is anodized.

Using the joint substrate as support for the plurality of valve-metal anode slugs is a very cost-effective way of anodization of the valve-metal of a plurality of valve-metal capacitors at the same time with a very low risk of mechanical handling damage due to substrate support.

In a further cost-effective embodiment, the first conductive layer and/or the second conductive layer is formed by silver-filled conductive epoxy.

In a preferred embodiment, cost-effective simultaneous voltage conditioning of a plurality of tantalum capacitors provided on a single substrate can be conducted according to the present invention because, in a preferred embodiment, a grid of second connectors is provided on the lower side of the substrate, electrically connecting all second conductive pads of the upper side of the substrate with one cathode terminal, preferably accommodated on the lower side of the substrate. For voltage conditioning, the one anode terminal and the one cathode terminal are connected with the power supply inside the furnace.

The overmolding is preferably accomplished by using a plastic frame (used as a containment dam) placed on the substrate for damming and filling with overmold material. Further preferred is that the frame has a pressure sensitive adhesive backing to secure it to the substrate. Alternatively, the substrate can be overmolded using standard transfer molding equipment.

At least the above problem(s) is also solved by a leadless solid electrolyte capacitor manufactured by the above described method. Such capacitor provides the above described advantages.

At least the problem(s) is further solved by a leadless solid electrolyte capacitor comprising a substrate and a sintered and oxidized (anodized) box-shaped valve-metal anode slug, wherein the valve-metal anode slug is electrically connected by a first electrically conductive layer provided on its first end-face forming the anode with a first conductive pad accommodated on the upper side of the substrate, wherein the first electrically conductive layer is covered by a first non-conductive layer, wherein a lower side of the valve-metal anode slug is mechanically connected to a cured non-conductive epoxy target area free of solder mask accommodated on the upper side of the substrate, wherein a second end-face (opposite to the first end-face) of the valve-metal anode slug provided with a $MnO_2$ layer and a conductive coating (preferably Ag coating or graphite coating) accommodated above the $MnO_2$ layer carries a second conductive layer forming a cathode, which is electrically connected to a second conductive pad accommodated on the upper side of the substrate, wherein the first conductive pad and the second conductive pad on the substrate are isolated by the non-conductive epoxy target area free of solder mask, wherein the non-conductive epoxy target area free of solder-mask lies in between the first conductive pad and the second conductive pad on the surface of the substrate, and wherein the upper side of the substrate with the assembled valve metal anode slug is covered with an overmold.

Such a leadless solid electrolyte capacitor, in particular, tantalum capacitor, has a good volume efficiency of around 65% to 73% (active anode volume/tantalum capacitor volume) as compared to traditional leaded tantalum capacitor design of around 22% to 30%. With its higher volume efficiency, leadless design can produce higher capacitance value or higher voltage rating tantalum capacitor in the same case size than the leaded design.

As described above, it is cost-effective to use silver-filled epoxy material for the first electrically conductive layer and/or the second electrically conductive layer.

It is further advantageous that the first conductive pad provided on the upper side of the substrate and/or the second conductive pad provided on the upper side of the substrate comprises a copper layer and preferably also an ENIG layer (ENIG=Electroless Nickel Immersion Gold consisting of electroless nickel plating covered with a thin layer of immersion gold which protects the nickel from oxidation), wherein the ENIG layer covers the copper layer.

It is further advantageous that the first conductive pad provided on the upper side of the substrate and/or the second conductive pad provided on the upper side of the substrate are electrically connected by a via with a respective conductive pad on the lower side of the substrate in order to connect the conductive pad with the grid of first connectors or second connectors, respectively, as described above.

A full and enabling disclosure of the present invention, including the best mode thereof, directed to one of ordinary skill in the art is set forth in the following specification of one embodiment of the inventive method and capacitor. Thereby, further features, aspects, objects, advantages and possible applications are presented that are part of the present invention independent of the features specified in the present claims.

DETAILED DESCRIPTION

In the following, the inventive method for manufacturing and the inventive capacitor are explained with regard to a tantalum capacitor, but are not limited to this valve-metal. The inventive method for manufacturing and the inventive capacitor can be realized for any other valve-metal analogously.

Figure 1:
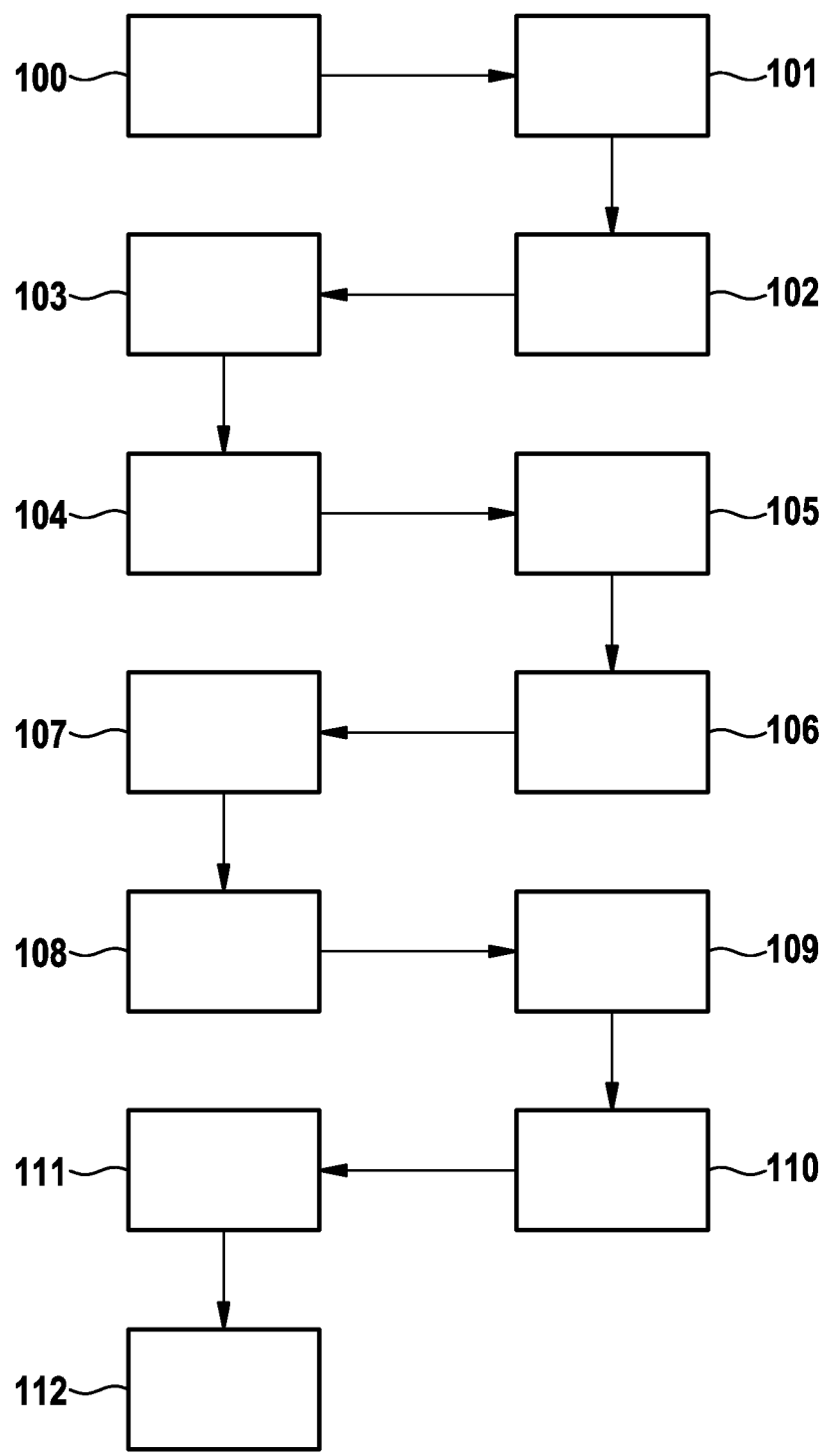
FIG. 1 shows a flow chart of an embodiment of the inventive method for manufacturing.

The process steps of the inventive method for manufacturing are explained by means of the flow chart shown in FIG. 1 in the following. Some intermediate structures of the capacitor assembly are shown in FIGS. 2 to 6.

In a first step 100, tantalum powder is pressed to a pellet and sintered as is conventionally known to the skilled person. In the next step 101, the pressed and sintered pellet is singulated, for example, by means of sawing or laser cutting into a plurality of box-shaped sintered tantalum anode slugs 1 and placed into tape and reel of a SMT component placement system (pick and place machine).

Then, in step 102, a FR4 (flame retardant glass reinforced epoxy laminate sheet in compliance with the standard UL94V-0) substrate 2 is provided comprising a plurality of first conductive pads 3 and second conductive pads 5 on the upper side of the substrate 2. In between each first conductive pad 3 and the respective neighboring second conductive pad 5, a non-conductive epoxy target area without solder mask 4 is formed, preferably by screen-printing. Each first conductive pad 3 and each second conductive pad 5 comprises a lower Cu layer 3b, 5b and an upper ENIG layer 3a, 5a covering the Cu layer 3b, 5b (see e.g., FIG. 2).

Figure 7:
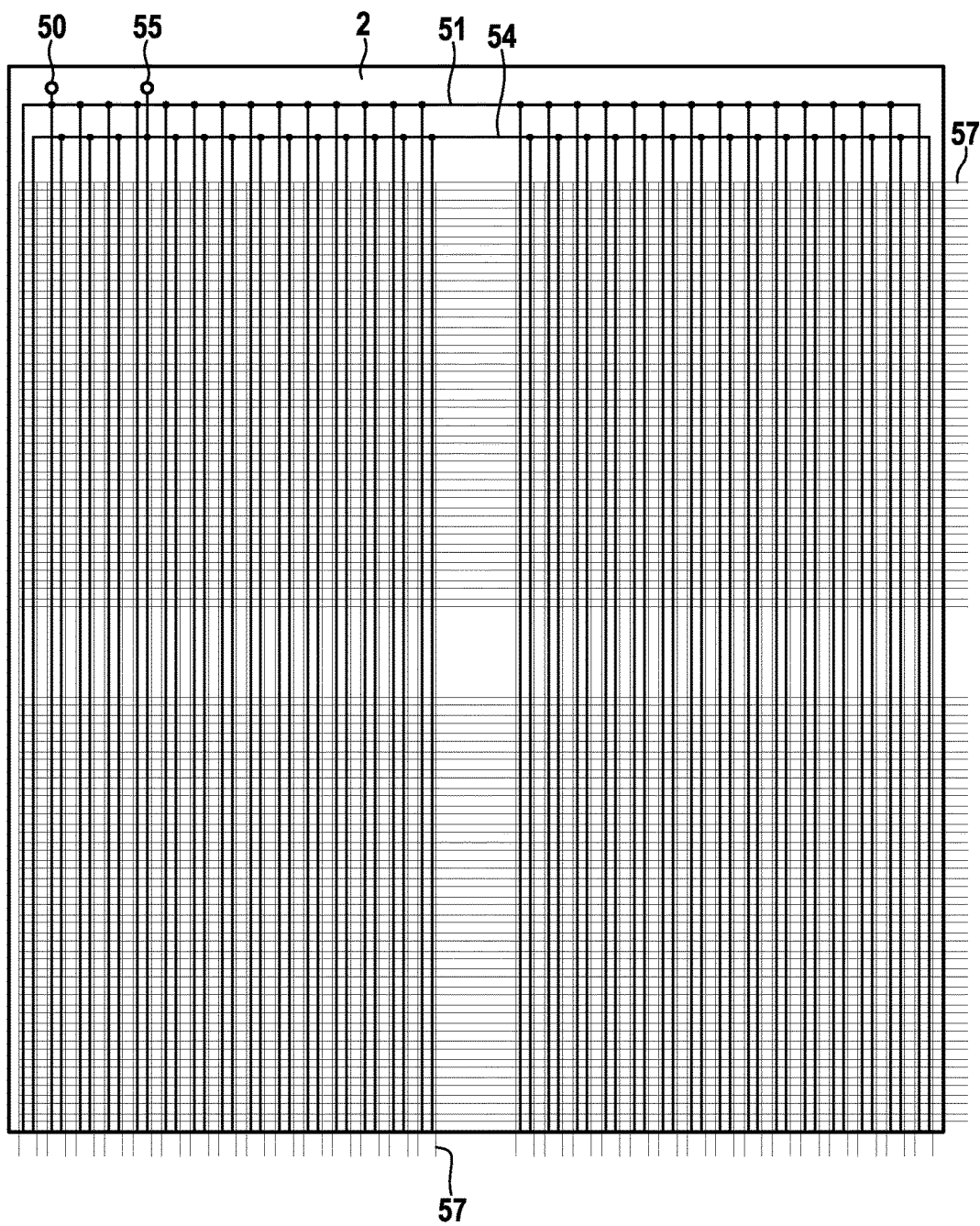
FIG. 7 shows the substrate of the capacitor assembly of FIG. 2 in a whole panel view with singulation cut lines.
Figure 8:
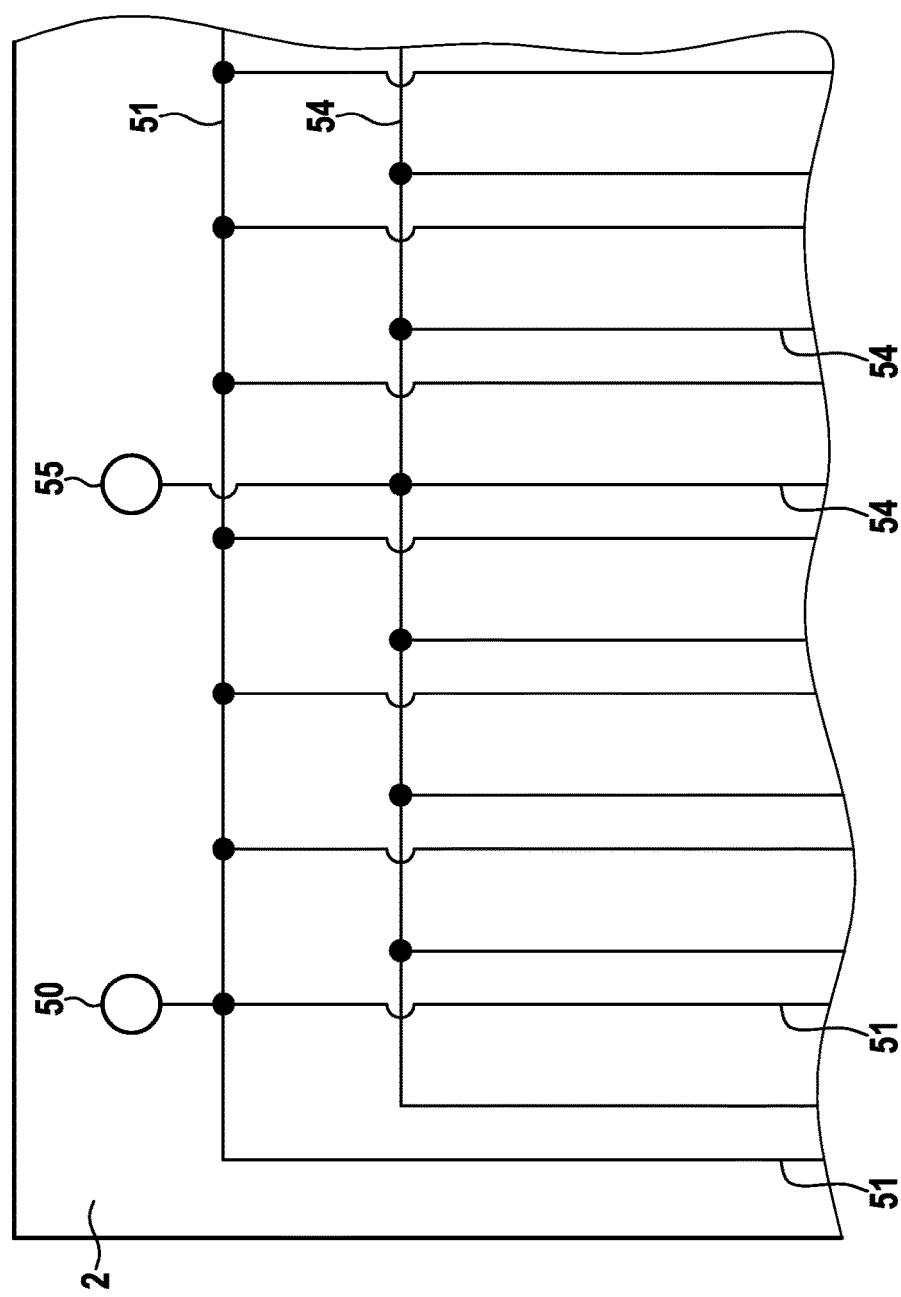
FIG. 8 shows a section of the view shown in FIG. 7 with an anode and a cathode terminal connection pads that were connected to perspective anode terminals and cathode terminals of all tantalum capacitors in the panel.

As shown in FIGS. 7 and 8, the substrate further provides on its lower side a grid of first connectors 51 and a grid of second connectors 54, wherein the grid of first connectors 51 electrically connects the first conductive pads 3 with one anode terminal 50, and the grid of second connectors 54 electrically connects the second conductive pads 5 with one cathode terminal 55 using a via 6, 7 and a conductive pad 8, 9, respectively. The anode terminal 50 and the cathode terminal 55 are preferably accommodated on the lower side of the substrate 2. Each conductive pad 8, 9 on the lower side of the substrate comprises an upper Cu layer 8b, 9b and a lower ENIG layer 8a, 9a covering the Cu layer 8b, 9b (see FIGS. 2 to 6).

Figure 2:
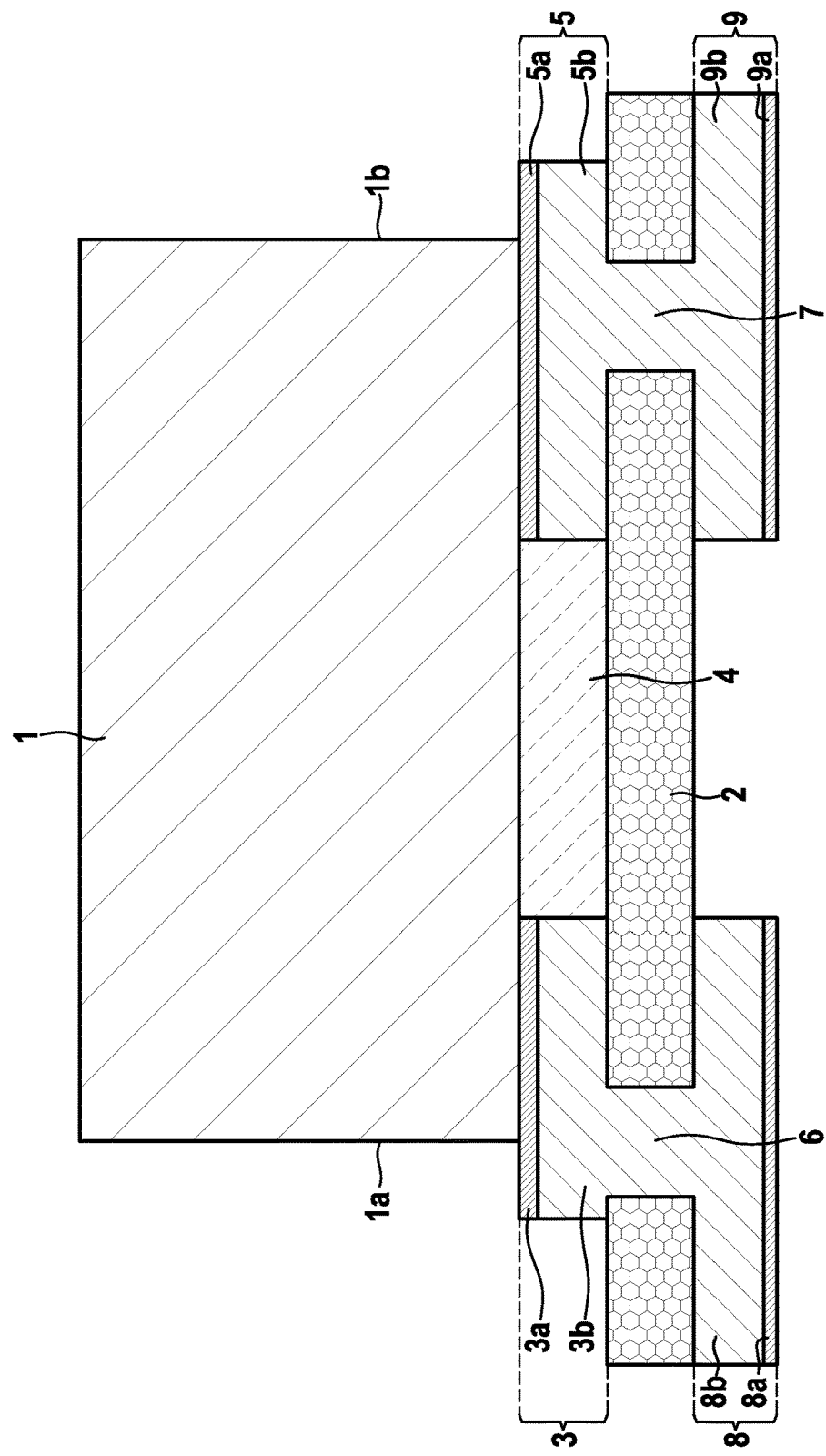
FIG. 2 shows a cross section of a capacitor assembly after a first manufacturing step.

Then, the standard SMT pick and place machine (not shown) is used to place the tantalum anode slug 1 on the substrate 2 such that the lower side (face) of the box-shaped sintered tantalum anode slug 1 is directly adjacent to the first and second conductive pads 3, 5 and the non-conductive epoxy target area without solder mask 4, as it is shown in FIG. 2.

In the next step 103, the non-conductive epoxy of the epoxy target area without solder mask 4 is cured, which secures the tantalum anode slug 1 in place by a mechanical connection of the cured non-conductive epoxy and the lower side of the sintered tantalum anode slug 1.

Figure 3:
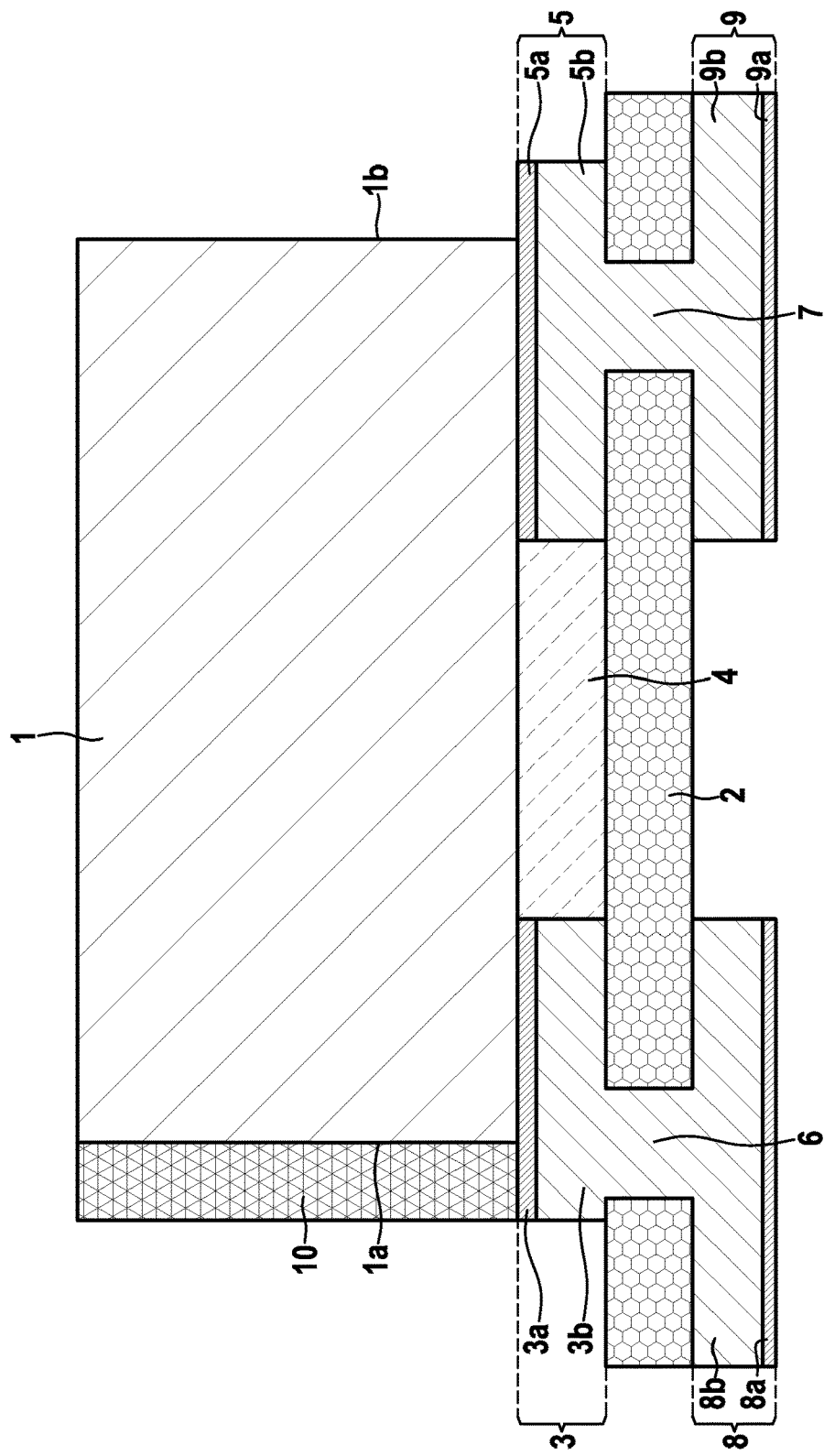
FIG. 3 shows the cross section of a capacitor after a second manufacturing step.

After that, in step 104, the tantalum anode is connected to the first conductive pad 3 by a first conductive layer 10 deposited on the first end-face 1a of the tantalum anode slug 1 (see FIG. 3). The first conductive layer 10 is made of, for example, a silver-filled conductive epoxy which is cured after deposition.

In the next step 105, tantalum anode dielectric formation is accomplished by connecting the positive side of a power supply to the anode terminal 50 (see FIG. 8) on the lower side of substrate 2. After connecting the anode terminal 50 to the power supply, the substrate 2 supporting the plurality of sintered tantalum anode slugs 1 is placed into the anodizing solution tank comprising, for example, an acid, and standard tantalum dielectric formation process is conducted by an electrochemical process. The sintered tantalum anode slug 1 is thereby converted into oxidized and sintered tantalum anode slug 11 as shown in FIG. 4.

Figure 4:
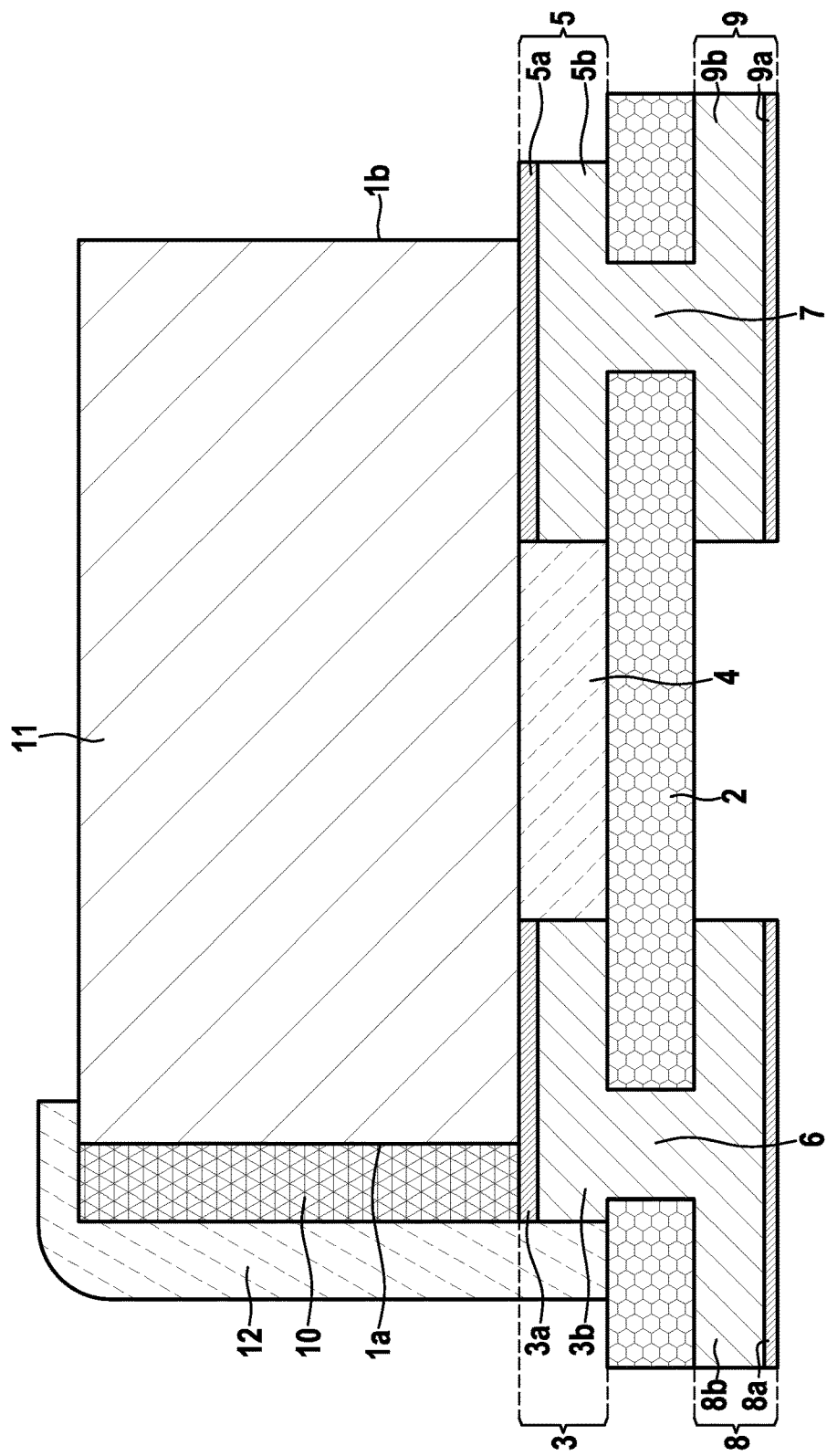
FIG. 4 shows the cross section of a capacitor after a third manufacturing step.

Then, in step 106, a non-conductive epoxy layer 12 is provided on the outer surface of the first conductive layer 10, as shown in FIG. 4 and cured so that all exposed anode surface is covered and electrically isolated.

In the next step 107, the standard tantalum capacitor multiple $MnO_2$ deposition process and silver coating process steps are executed at the same time with all oxidized tantalum anode slugs 11 carried by substrate 2. Preferably, the $MnO_2$ deposition process comprises the steps that the substrate with the slugs 11 is repeatedly immersed in manganese nitrate and pyrolyzed afterwards. In order to visualize the $MnO_2$ and silver coating on the exposed surfaces of the oxidized and sintered tantalum anode slug 11 (see FIG. 4) the tantalum anode slug is indicated with reference number 21 (see FIG. 5).

Figure 5:
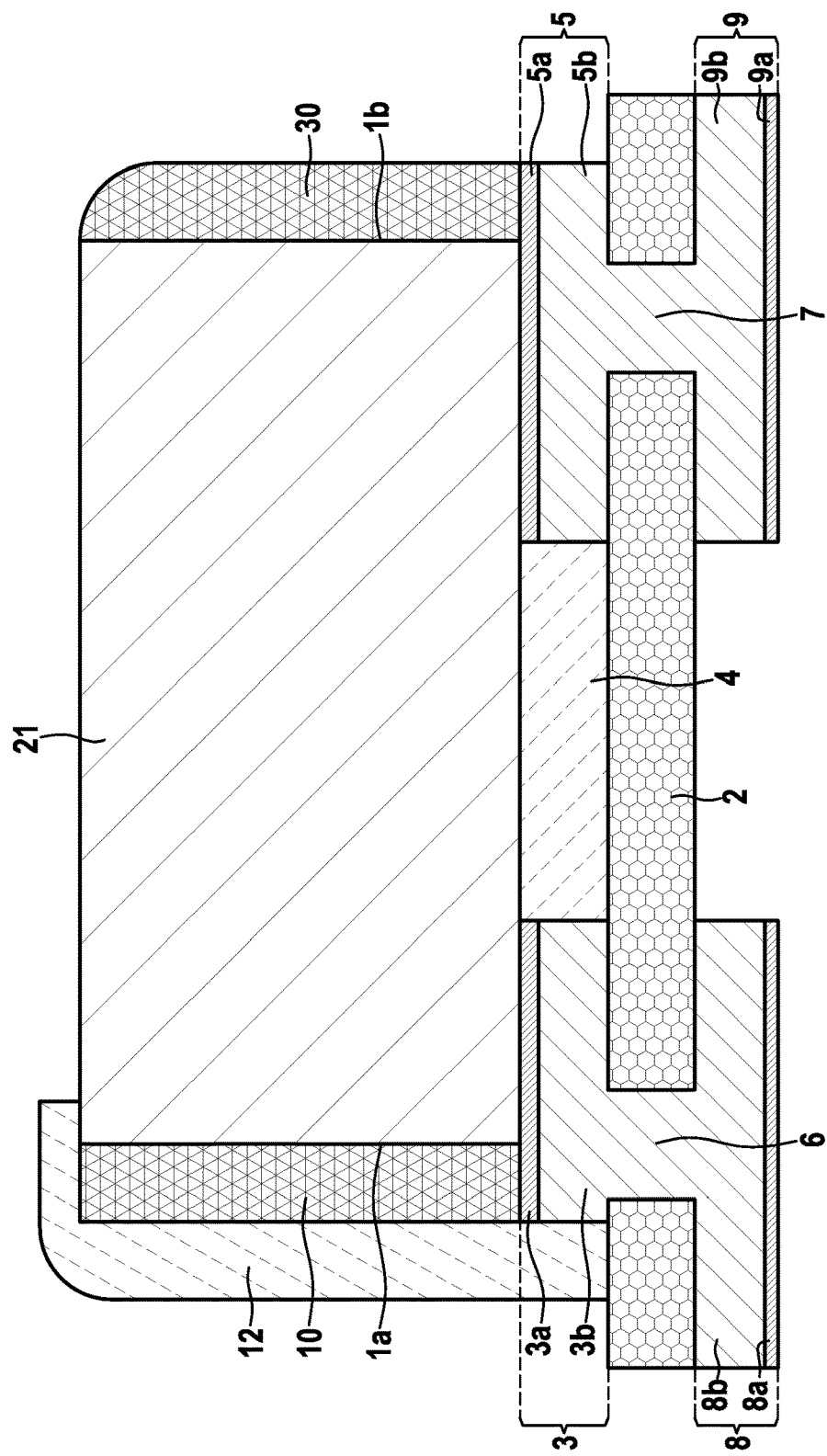
FIG. 5 shows the cross section of a capacitor after a fourth manufacturing step.
Figure 6:
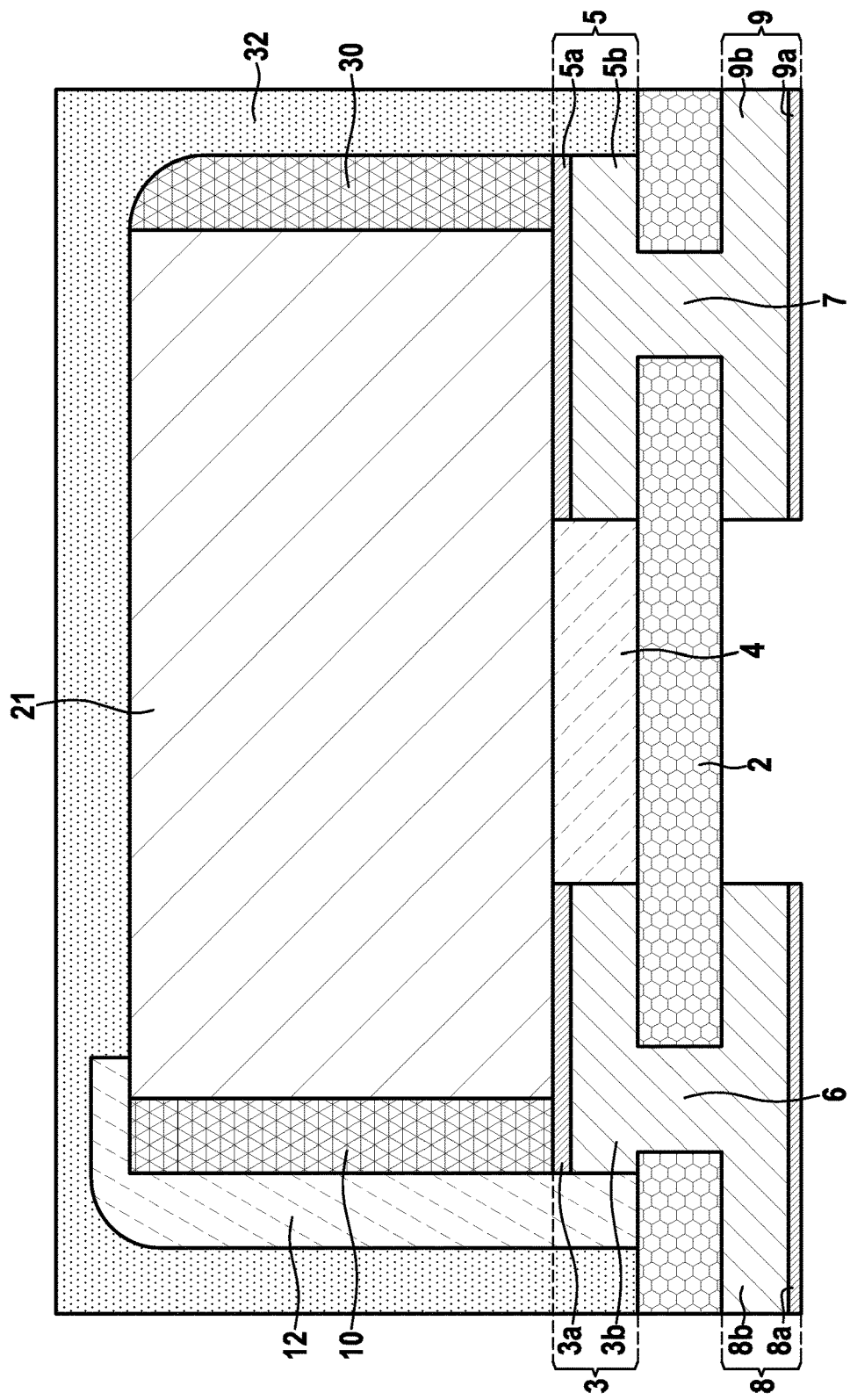
FIG. 6 shows the cross section of a capacitor after a fifth manufacturing step.

After that, in step 108, the tantalum cathode is connected to the respective second conductive pad 5 on the upper side of the substrate 2 by a silver-filled conductive epoxy layer 30 provided on a second end-face 1b of the tantalum anode slug 21 (see FIG. 5). After dispense, the silver-filled conductive epoxy is cured.

Then, in step 109, a plastic frame is placed on the substrate panel and dammed in order to fill the free space between the tantalum slugs 21 and the surface of the substrate 2 and the capacitor assembly with overmold material 32 (see FIG. 6), as described above.

In the following step 110, voltage conditioning (burn-in) of all tantalum capacitors accommodated on the same substrate 2 can easily be accomplished by directly connecting the anode terminal 50 and cathode terminal 55 (see FIG. 8) to a power supply inside the furnace without additional fixtures.

Then, in step 111, singulation along cut lines 57 (see FIG. 7), preferably by sawing or laser cutting, and final electrical testing of singulated individual tantalum capacitors is performed.

In the following step 112, tape and reel operation for single tantalum capacitors can be provided for shipment to the customer.

The inventive method for manufacturing provides a cost effective way to produce a leadless solid electrolyte capacitor with good volume efficiency avoiding mechanical handling damage and allows down-sizing.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the end points.

LIST OF REFERENCE NUMBERS

1 sintered tantalum anode slug
1a first end-face of the tantalum anode slug
1b second end-face of the tantalum anode slug
2 substrate
3 first conductive pad
3a ENIG layer of the first conductive pad 3
3b Cu layer of the first conductive pad 3
4 non-conductive epoxy target area without solder mask
5 second conductive pad
5a ENIG layer of the second conductive pad 5
5b Cu layer of the second conductive pad 5
6, 7 via
8, 9 conductive pad
8a, 9a ENIG layer
8b, 9b Cu layer
10 first conductive layer
11 anodized tantalum anode slug
12 first non-conductive layer
21 anodized tantalum anode slug with MnO2 and silver coating
30 second conductive layer
32 over mold
50 anode terminal
51 first connector
54 second connector
55 cathode terminal
57 cut line
100, 101, 102, 103, 104, 105, 106, 107, 108, 109, 110, 111, 112 steps of one embodiment of the inventive method for manufacturing

We claim:

1. A method for manufacturing a leadless solid electrolyte capacitor comprising the following steps:
   placing a valve-metal anode slug with its lower side on a substrate with a first conductive pad, a second conductive pad and a non-conductive epoxy target area without solder mask, wherein the non-conductive epoxy target area without solder mask is accommodated in between and electrically isolating the first conductive pad and the second conductive pad,
   curing the non-conductive epoxy target area,
   depositing a first conductive layer on a first end-face of the valve-metal anode slug and curing the first conductive layer, thereby electrically connecting the valve-metal anode slug with the first conductive pad,
   forming a dielectric on a valve-metal material of the valve-metal anode slug by anodization to form an oxidized valve-metal anode slug,
   depositing and curing a first non-conductive layer to cover an exposed surface of the first conductive layer,
   depositing a MnO2 layer and an electrically conductive coating on exposed surfaces of the oxidized valve-metal anode slug,
   depositing a second conductive layer on a second end-face of the oxidized valve-metal anode slug and curing the second conductive layer, thereby forming a cathode connected with the second conductive pad,
   overmolding, and
   singulating of each single capacitor and the substrate, in case the above procedure was accomplished for a plurality of valve-metal anode slugs on a single substrate.

2. The method according to claim 1, wherein a SMT pick and place machine is used in order to place the valve-metal anode slug on the substrate.

3. The method according to claim 1, wherein a grid of first connectors is provided on a lower side of the substrate electrically connecting the first conductive pad of an upper side of the substrate with one anode terminal, and wherein the dielectric formation is accomplished by connecting a positive side of a power supply with the one anode terminal and placing the substrate into an anodize solution tank.

4. The method according to claim 1, wherein at least one of the first conductive layer and the second conductive layer is formed by silver filled conductive epoxy.

5. The method according to claim 3, wherein a grid of second connectors is provided on the lower side of the substrate electrically connecting the second conductive pad of the upper side of the substrate with one cathode terminal, and wherein for voltage conditioning the one anode terminal and the one cathode terminal are connected with the power supply inside a furnace.

6. The method according to claim 1, wherein the valve-metal anode slug is produced by pressing and sintering of a pellet of a powder valve-metal material followed by singulating a plurality of valve-metal anode slugs from the sintered pellet.

7. The method according to claim 1, wherein between the overmolding and the singulating step a voltage conditioning step is conducted.

8. A leadless solid electrolyte capacitor manufactured by the method according to claim 1.

9. A leadless solid electrolyte capacitor comprising:
a substrate; and
a sintered and oxidize valve-metal anode slug, wherein the valve-metal anode slug is electrically connected by a first electrically conductive layer provided on its first end-face with a first conductive pad on an upper side of the substrate,
wherein a lower side of the valve-metal anode slug is mechanically connected to a cured non-conductive epoxy target area without solder mask,
wherein a second end-face of the valve-metal anode slug provided with a $MnO_2$ layer and a conductive coating accommodated above the $MnO_2$ layer carries a second conductive layer forming a cathode, which is electrically connected to a second conductive pad on the upper side of the substrate, wherein the first conductive pad and the second conductive pad on the substrate are isolated by the cured non-conductive epoxy target area without solder mask, and
wherein the upper side of the substrate with an assembled sintered and oxidized valve metal anode slug comprising the $MnO_2$ layer and conductive coating is covered with an overmold.

10. The capacitor of claim 9, wherein the valve-metal is tantalum.

11. The capacitor of claim 9, wherein at least one of the first electrically conductive layer and the second electrically conductive layer comprise silver filled epoxy.

12. The capacitor of claim 9, wherein at least one of the first conductive pad provided on the upper side of the substrate and the second conductive pad provided on the upper side of the substrate comprises a Cu layer.

13. The capacitor of claim 9, wherein at least one of the first conductive pad and the second conductive pad, both provided on the upper side of the substrate, have a via connecting the said pad with a respective conductive pad on a lower side of the substrate.

* * * * *